(No Model.)

H. O. LOTHROP.
WIRE FERRULE.

No. 254,559.  Patented Mar. 7, 1882.

Witnesses.
S. N. Piper
E. B. Pratt

Inventor.
Henry O. Lothrop.
by R. H. Eddy atty.

UNITED STATES PATENT OFFICE.

HENRY O. LOTHROP, OF BOSTON, MASSACHUSETTS, ASSIGNOR TO HIMSELF AND WILLIAM H. LOTHROP, OF SAME PLACE.

WIRE FERRULE.

SPECIFICATION forming part of Letters Patent No. 254,559, dated March 7, 1882.

Application filed November 21, 1881. (No model.)

*To all whom it may concern:*

Be it known that I, HENRY O. LOTHROP, of Boston, of the county of Suffolk and State of Massachusetts, have invented a new and useful Improvement in the Manufacture of Wire Ferrules; and I do hereby declare the same to be described in the following specification and represented in the accompanying drawings, of which—

Figure 1:
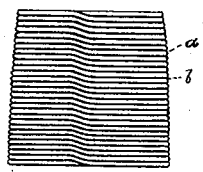
Figure 2:
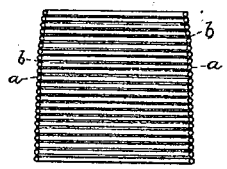
Figure 3:
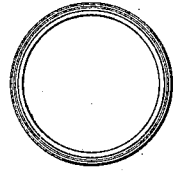

Figure 1 is a side elevation, Fig. 2 a longitudinal section, and Fig. 3 an end view, of a ferrule of my improved kind.

This aforesaid ferrule is composed of wire wound in a spiral or in a cylinder, and having the coils covered with solder and connected each with that or those next adjacent to it by the solder, and subsequently with the solder expanded, so as to render the ferrule tapering between its ends.

Prior to my present invention ferrules constructed by winding wire in a spiral and covering it with solder and connecting the coils by such solder have been cylindrical only; but in the production of my improved manufacture and in carrying it out a ferrule after having been so connected has its coils and their connecting covering expanded radially and longitudinally, so as to impart to the ferrule a tapering instead of a cylindrical form, such expansion of them being effected by driving or forcing into the tubular ferrule a tapering plug or expander, or by any other suitable means, device, or devices.

In the drawings, $a$ denotes the wire wound spirally, and $b$ its connecting covering of solder, the ferrule being tapering between its ends, as shown.

What I claim as my invention is as follows, viz:

As an improved article of manufacture, a ferrule made of wire wound spirally on a cylinder, and having the coils covered and connected by solder, and subsequently with the solder expanded, as described, so as to cause the ferrule to taper between its ends, as set forth.

HENRY O. LOTHROP.

Witnesses:
R. H. EDDY,
S. N. PIPER.